United States Patent [19]
Wang

[11] Patent Number: 5,813,059
[45] Date of Patent: Sep. 29, 1998

[54] TWO-STAGE WATER-SAVING FLUSHING DEVICE FOR A TOILET TANK

[76] Inventor: Kuo-Hsin Wang, 9F3R,No.210, Chung Hsueh Rd., Tainan, Taiwan

[21] Appl. No.: 726,779

[22] Filed: Oct. 7, 1996

[51] Int. Cl.$^6$ ...................................................... E03D 1/14
[52] U.S. Cl. ..................................................... 4/325; 4/324
[58] Field of Search ............................... 4/325, 324, 326, 4/327

[56] References Cited

U.S. PATENT DOCUMENTS

| | | | |
|---|---|---|---|
| 3,909,856 | 10/1975 | Dunn, Jr. | 4/326 |
| 4,122,564 | 10/1978 | Addicks et al. | 4/326 |
| 4,175,295 | 11/1979 | Cameron | 4/327 |
| 5,333,332 | 8/1994 | Kam | 4/326 |

*Primary Examiner*—David J. Walczak

[57] ABSTRACT

A two-stage water-saving flushing device adapted to be fixed in a toilet tank includes an overflow tube made up of one outer tube and one filter tube extensibly connected with the outer tube to be applied to different-sized toilet tanks. The flushing device further has a pressing unit which has a base plate with a cylinder for housing a pressing tube and a function rod inserted through the pressing tube. The function rod is pressed down to flush a large amount of water, and pulled up to flush a small amount of water, by a first arm pulled up to lift a valve of a low-level exit tube connected with the first arm with a chain, and by a second arm pulled up to lift a valve of a high-level exit tube connected with the second arm with a chain.

3 Claims, 10 Drawing Sheets

TWO-STAGE WATER-SAVING FLUSHING DEVICE FOR A TOILET TANK

BACKGROUND OF THE INVENTION

This invention concerns a two-stage water-saving flushing device adapted to be fixed with a toilet tank, particularly having a new structure for flushing two different amount of water so as to save water.

Figure 1:
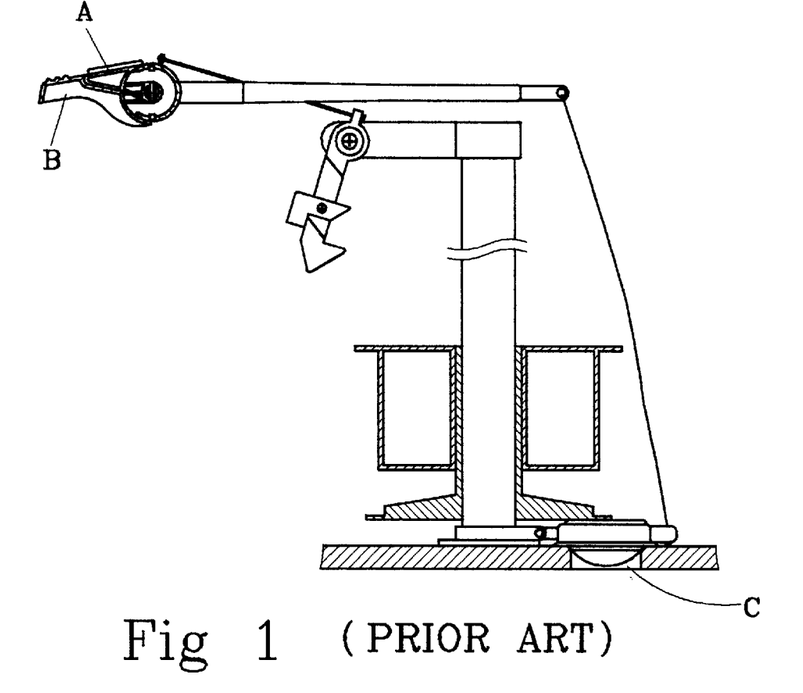
FIG. 1 is a first known conventional flush device for a toilet bowl.
Figure 2:
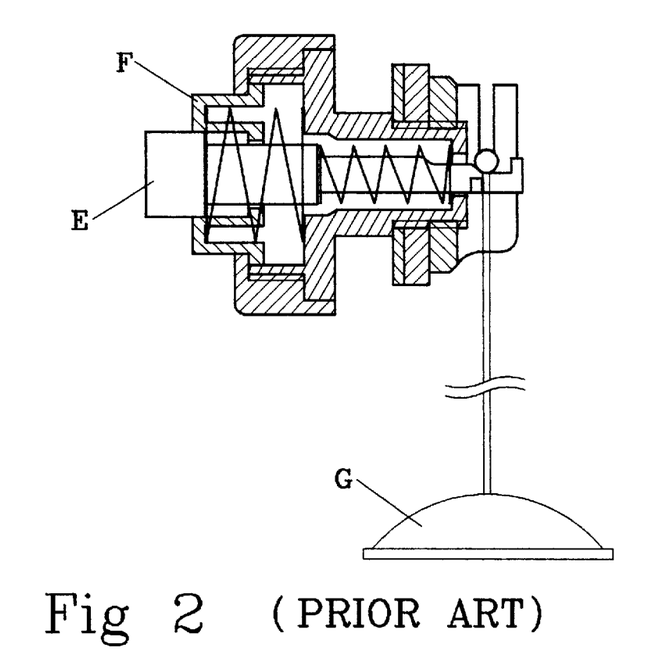
FIG. 2 is a second known conventional flush device for a toilet bowl.

At present, a known conventional two-stage flush device for a toilet tank has a single exit tube closed by a valve, a double press rod provided with a press button A and a press rod B, by which water volume flushed through an exit hole closed by the valve is controlled as shown in FIG. 1. And FIG. 2 shows that a double press button with two buttons E, F is provided for manually pressing only the button E or the two buttons E, F at the same time for flushing two different volume of water.

However, the known conventional two-stage flush device for a toilet tank can flush two different volume of water by means of a single exit tube, but the double buttons for flushing have a same direction of movement, easily and wrongly pressed to flush the larger volume of water by accident to lose water saving function they are designed for.

Figure 3:
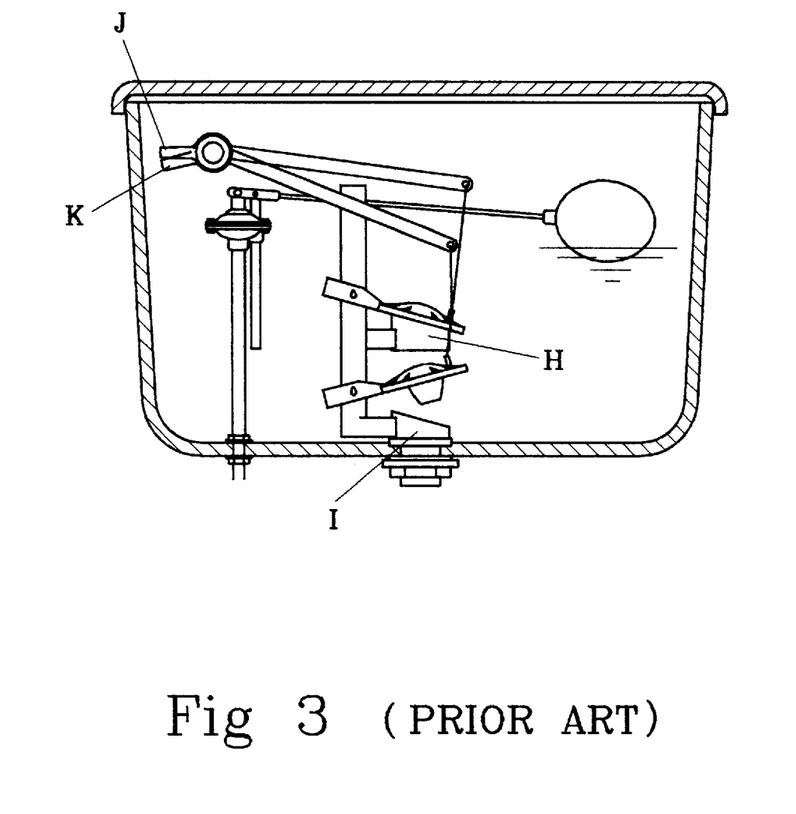
FIG. 3 is a third known conventional flush device for a toilet bowl.
Figure 4:
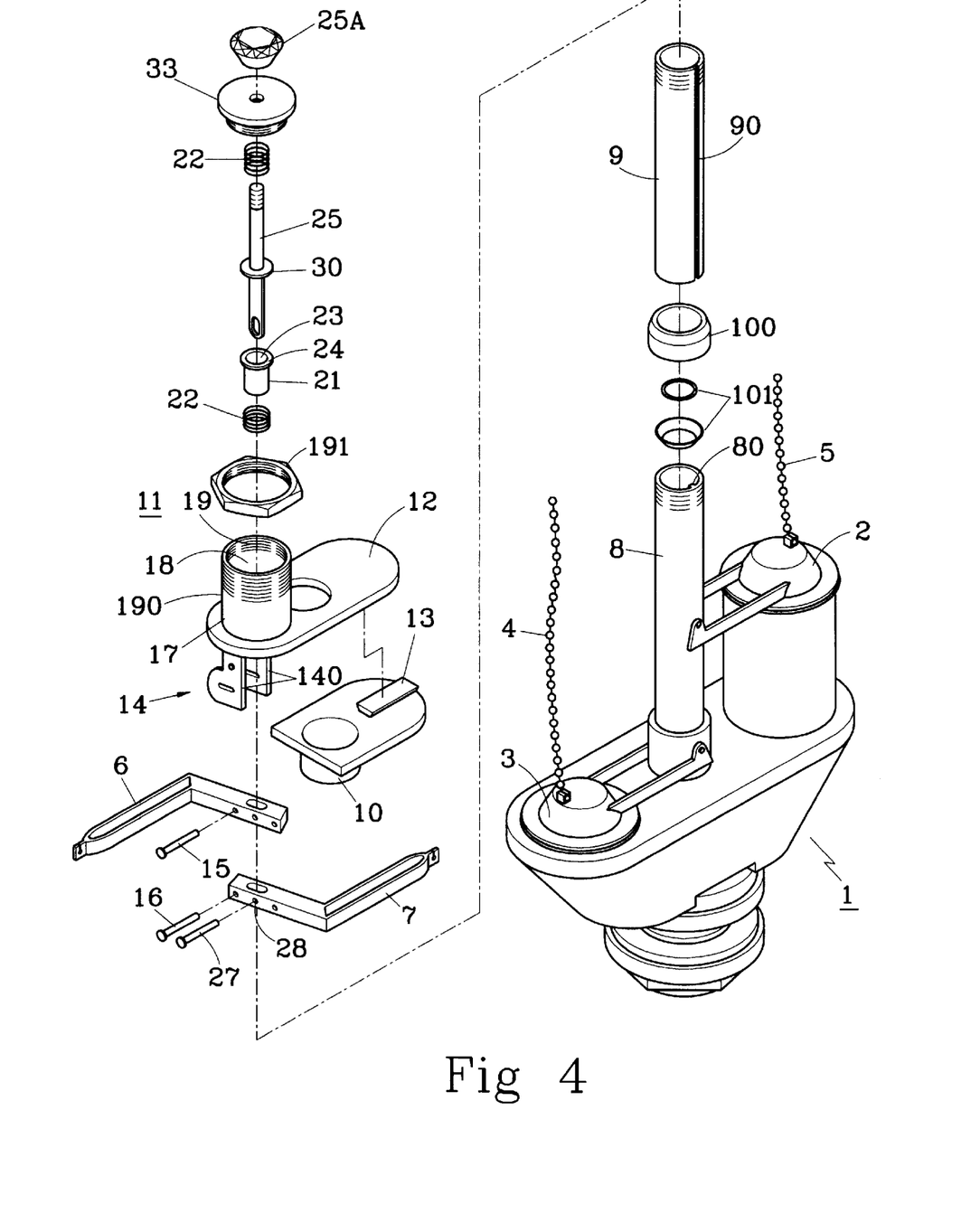
FIG. 4 is an exploded perspective view of a first preferred embodiment of a two-stage water-saving flushing device for a toilet tank in the present invention.
Figure 5:
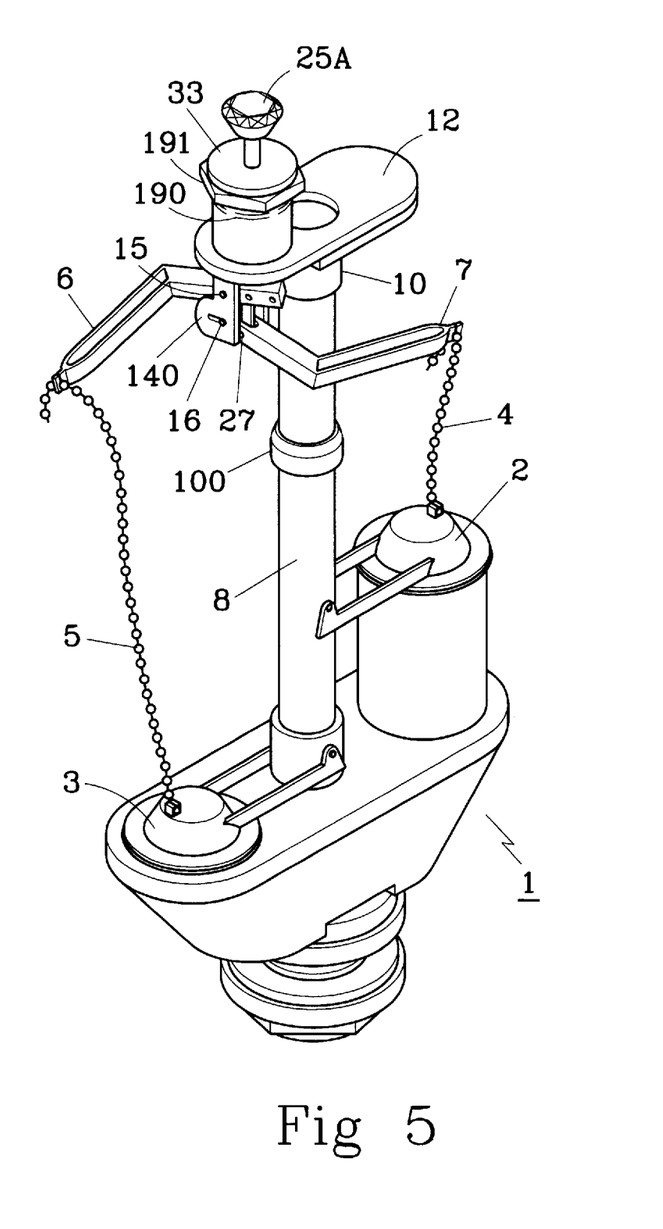
FIG. 5 is a perspective view of the first preferred embodiment of a two-stage water-saving flushing device for a toilet tank in the present invention.

There is another known conventional two-stage flush device for a toilet tank as shown in FIG. 3, having two exit holes H. I respectively closed and opened by separate valves controlled by two press buttons J, K. This kind of structure also has the same drawback seen in those shown in FIGS. 1 and 2, in addition to possible incorrect operation of the opening of the two valves.

SUMMARY OF THE INVENTION

This invention has been devised to have a new structure for easy handling in flushing two different amount of water.

This invention has following advantages.

1. A pressing unit for flushing water has a pressing rod for pressing to flush a large amount of water, and a pulling rod for pulling up to flush a small amount of water.

2. The pressing rod and the pulling rod are housed in a cylinder of a base plate, provided in a concentric way or in a non-concentric way.

3. When the pressing rod and the pulling rod are concentric, the pressing rod is housed in the cylinder of the base plate, and the pressing rod has a center hole for the pulling rod to pass through so that the pulling rod can flush a large amount of water when it is pressed down, and can flush a small amount of water when it is pulled up.

4. When the pressing rod and the pulling rod are non-concentric, the pressing rod and the pulling rod are separately provided for flushing different amount of water.

5. The pressing unit is positioned on the overflow tube, and the overflow tube consists of two tubes, one outer tube and one inner tube extensibly connected with the outer tube so as to be applied to differently sized toilet tanks.

DESCRIPTION OF THE PREFERRED EMBODIMENTS

A first preferred embodiment of a two-stage water-saving flushing device for a toilet tank in the present invention, as shown in FIGS. 4–7, includes a flushing unit 1 and a pressing unit 11 combined together. The flushing unit 1 consists of a high-level exit tube closed with a valve 2, a low-level exit tube closed with a valve 3, a first chain 4 connecting the high-level exit tube valve 2 with a first arm 6, a second chain 5 connecting the low-level exit tube valve 3 with a second arm 7, an overflow tube 8 positioned vertically between the high-level exit tube valve 2 and the low-level exit tube valve 3, an inner tube 9 fixed in the overflow tube 8, an annular stop 100 fitting around the overflow tube 8 so as to tighten or loosen the same tube 8, a pressing ring unit 101 fitting around the inner tube 9 so as to tighten or loosen the same tube 9 so that the inner tube 9 may be adjustably fixed firmly at any extended distance out of the overflow tube 8. Then this flushing device can be applied to differently sized toilet tanks such as A or B shown in FIGS. 13 and 14.

Figure 13:
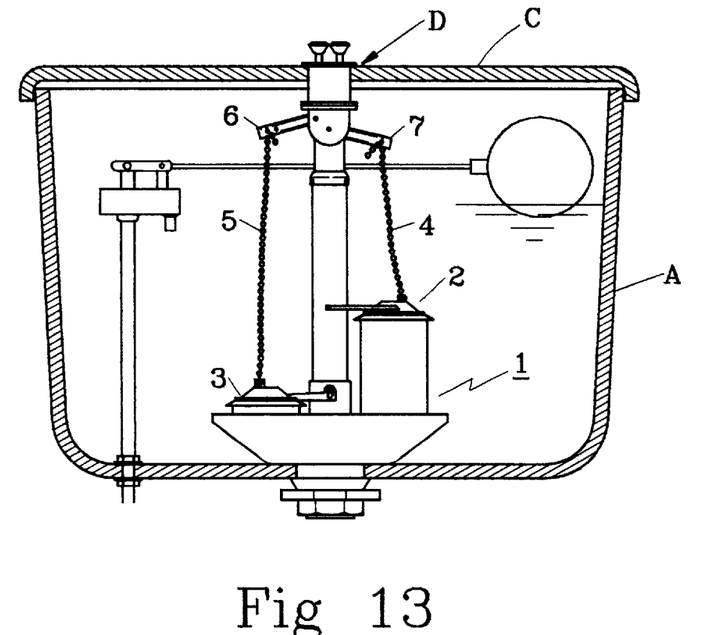
FIG. 13 a side view of the first preferred embodiment of a two-stage water-saving flushing device in the present invention assembled in a toilet tank; and, FIG. 14 is another side view of the first preferred embodiment of a two-stage water-saving flushing device for a toilet tank in the present invention assembled in a toilet tank.
Figure 14:
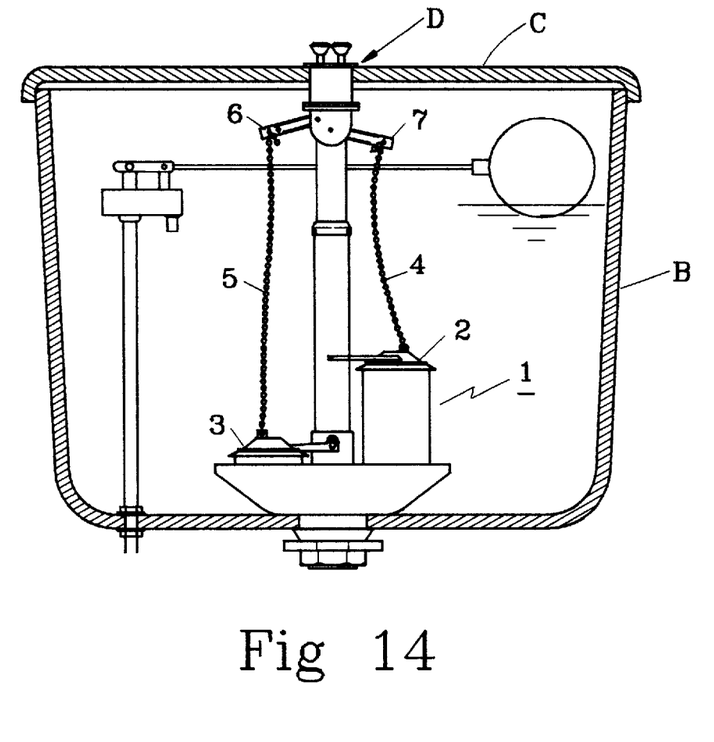

The inner tube 9 has a longitudinal straight groove 90 and the overflow tube 8 has an inward projection 80 on an inner surface so that the projection 80 may fit and move in the straight groove 90. Then the inner tube 9 can be extended or retracted in a definite direction. The inner tube 9 is firmly combined with a tube base 10 engaged with a base plate 12 of a pressing unit 11 by means of a dove-tail rail 13 of the tube base 10 engaging a dovetail groove of the base plate 12. Thus the tube base 10 can be adjusted in its position so as to correspond to a hole D of an upper lid C of the toilet tank, as shown in FIGS. 13 and 14.

The first arm 6 and the second arm 7 are connected together with a connecter 14, which is connected with the first and the second arm 6, 7 with two shafts 15, 16 laterally fitting through the first and the second arm 6, 7 and the connecter 14 so that the two shafts 15, 16 form two fulcrums. The shaft 15 extends to insert in two vertical parallel plates 140 of the base plate 12.

The pressing unit 11 includes a base plate 12, a pressing tube 21, two springs 22, 22 respectively located at an upper and a lower side of the pressing tube 21, a function rod 25 with a button 25A and a stopper 33 combined together. The base plate 12 has a vertical cylinder 17, which is provided with an interior space 18, female threads 19 formed in an inner surface, male threads 190 formed in an outer surface, and a through hole 20 in a lower portion. The male threads 190 engage with a nut 191 so that the pressing unit 11 may be fixed with the lower side of the toilet tank. In the interior space 18 is positioned the pressing tube 21, and the two springs 22, 22 fit respectively around an upper portion and a lower portion of the pressing tube 21. The lower end of the pressing tube 21 contact with an outer surface of one end of the first arm 6, and the pressing tube 21 further has a center hole 23 and a flange 24 on the upper end.

Figure 6:
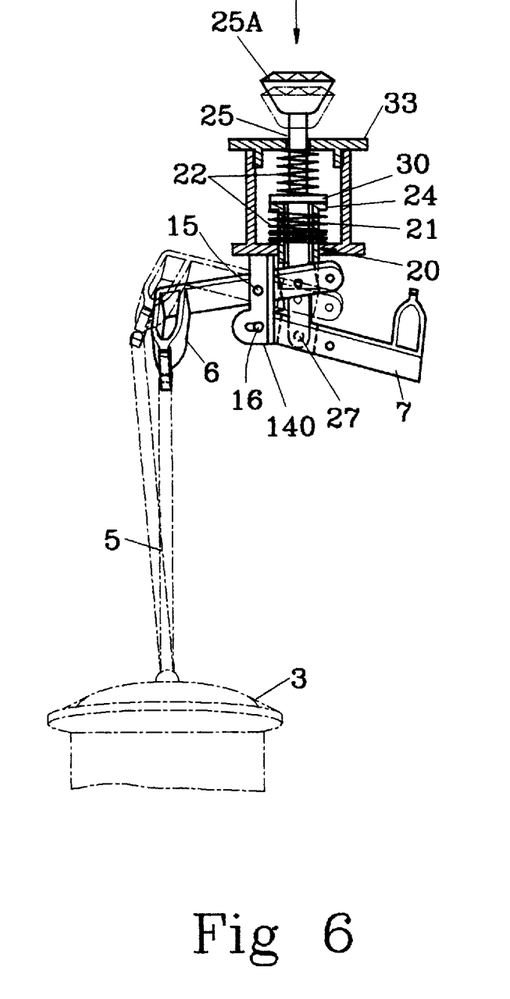
FIG. 6 is a cross-sectional view of the first preferred embodiment of a two stage water-saving flushing device for a toilet tank in the present invention, showing it flushing a large amount of water by pressing a pulling rod to let a first arm move.
Figure 7:
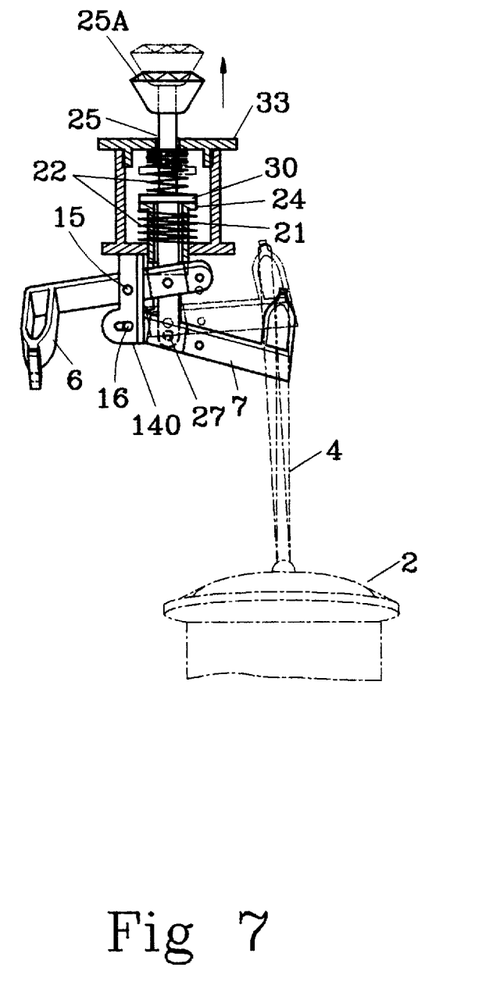
FIG. 7 is a cross-sectional view of the first preferred embodiment of a two-stage water-saving flushing device for a toilet tank in the present invention, showing it flushing a small amount of water by pulling up the pulling rod to let a second arm move.
Figure 8:
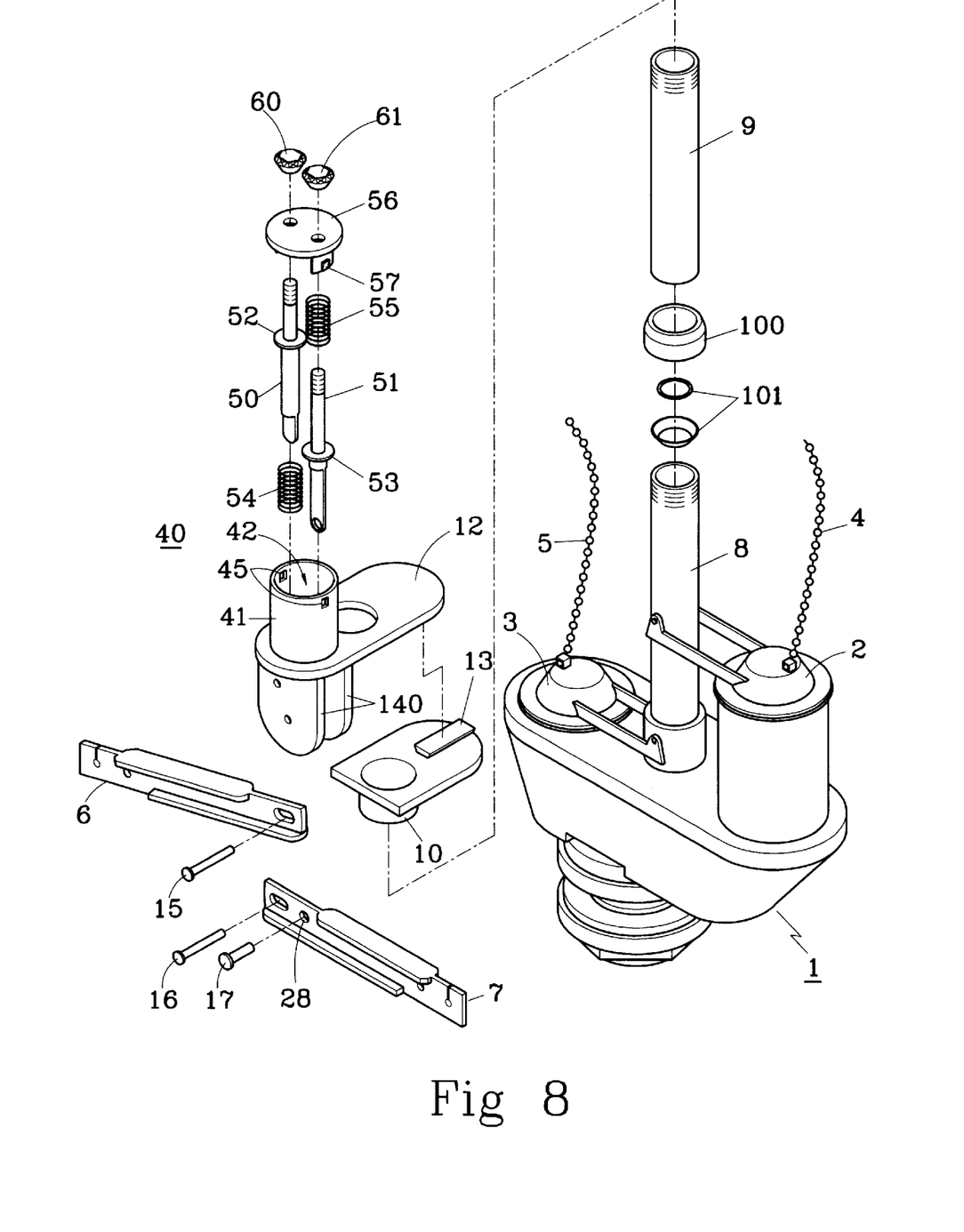
FIG. 8 is an exploded perspective view of a second preferred embodiment of a two-stage water-saving flushing device for a toilet tank in the present invention.
Figure 9:
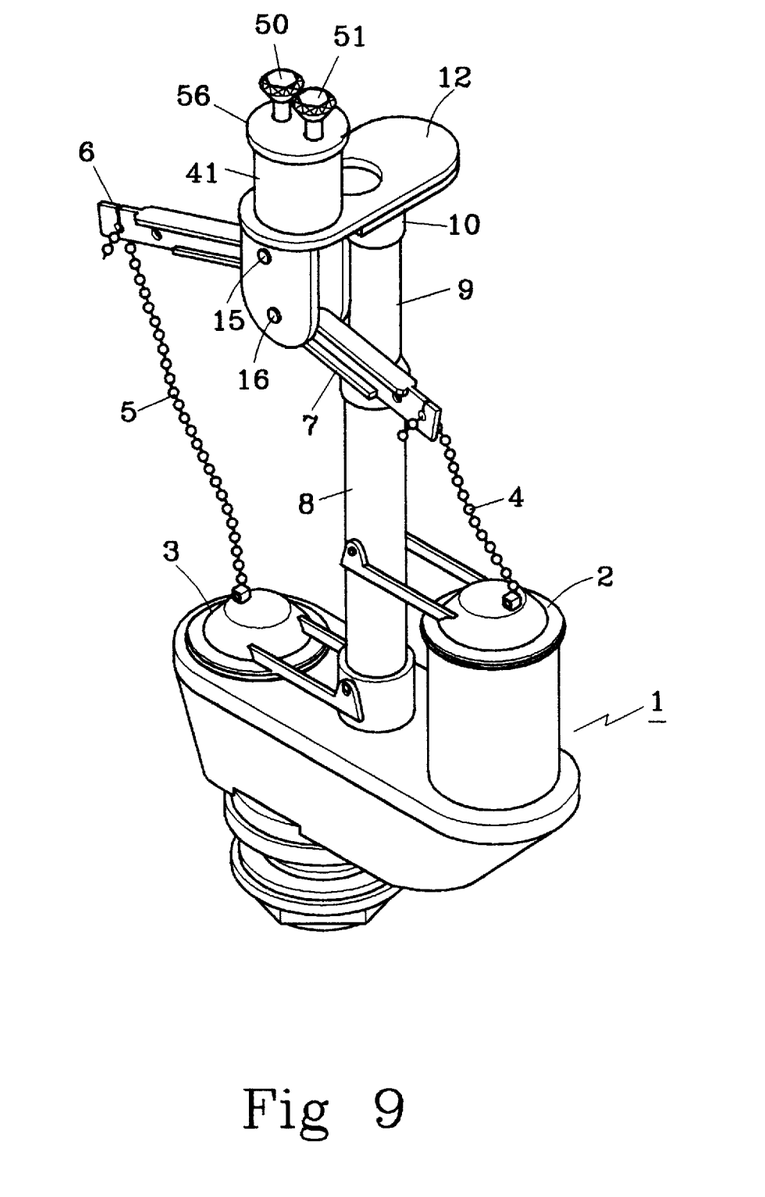
FIG. 9 is a perspective view of the second preferred embodiment of a two-stage water-saving flushing device for a toilet tank in the present invention.

The function rod 25 extends lengthwise through the center hole 23 of the pressing tube 21, and a rod button 25A is fixed with the function rod 25. The function rod 25 has a bottom end connected with the second arm valve 7 with a shaft 27 inserted in a hole 28 of the second arm 7. The function rod 25 further has a flange 30 in an intermediate portion, and the flange 30 normally rests on the flange 24 of the pressing tube 21. After the flushing device is assembled in the toilet tank, with an upper lid C closed on the tank, and with the stopper 33 engaging with the female threads 19 of the cylinder 17, the function rod 25 is pressed down, pressing down at the same time the pressing tube 21 to move the first arm 6, which then raises the low-level exit tube valve 3 to permit water to flush out for a large amount, as shown in FIG. 6. But if the function rod 25 is pulled up the lower end of second arm 7 is moved up with the shaft 16 functioning as a fulcrum. Then the high-level exit tube valve 2 is raised up at the same time, with water flushed out for a small amount.

Therefore, two different amount of water can be flushed out by different handling of the function rod 25, i.e. pressing down or pulling up movement, of the function rod 25, saving water needed for flushing.

A second preferred embodiment of a two-stage water-saving flushing device in the present invention is shown in FIG. 8–12 having the same structure for the flushing unit 1, the first arm 6, the second arm 7 as the first preferred embodiment, except a pressing unit 40 instead of the pressing unit 11 of the first preferred embodiment.

Figure 10:
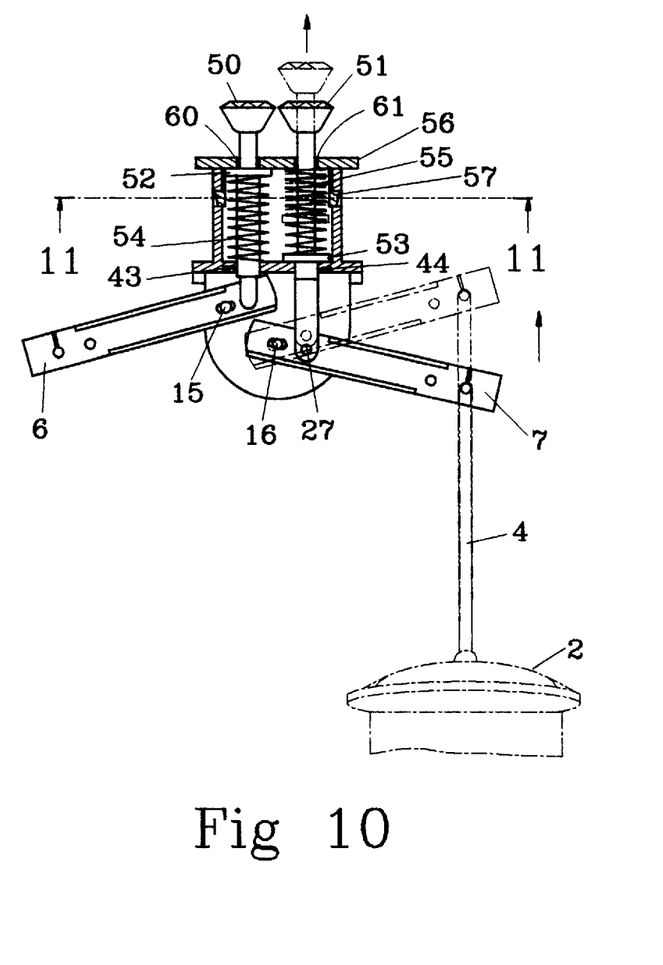
FIG. 10 is a cross-sectional view of the second preferred embodiment of a two-stage water-saving flushing device for a toilet tank in the present invention.
Figure 11:
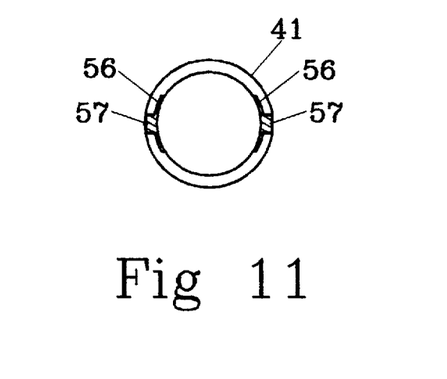
FIG. 11 is a cross-sectional view of line 8—8 in FIG. 10.
Figure 12:
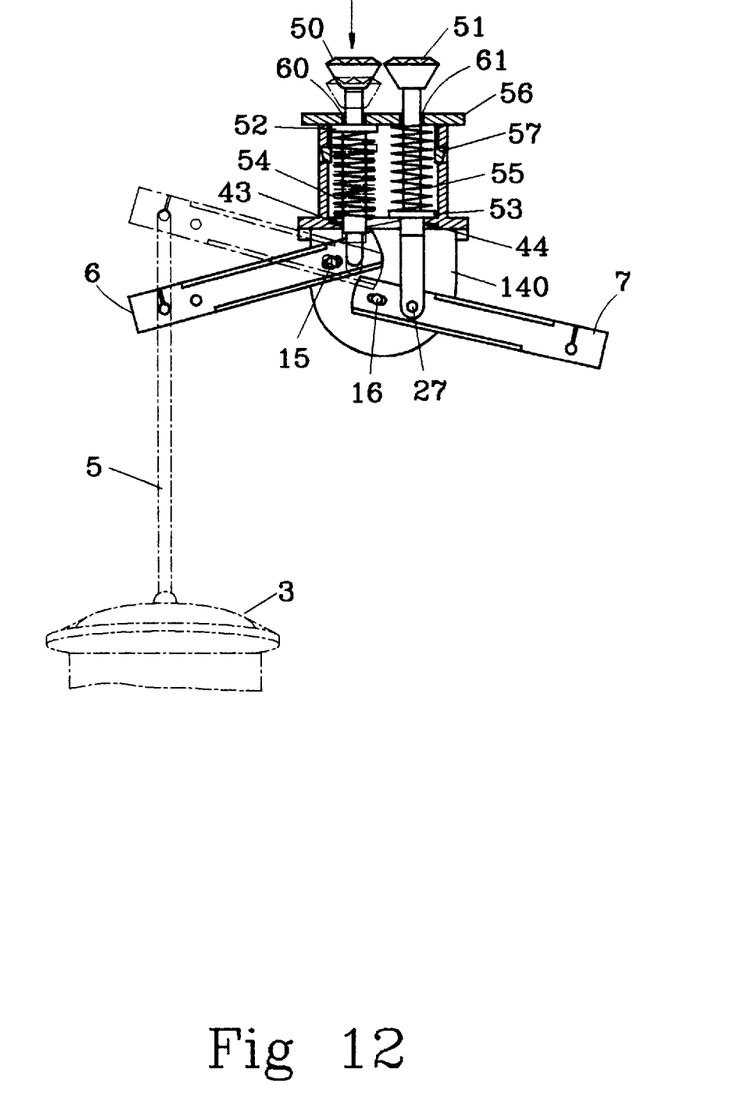
FIG. 12 is a cross-sectional view of the second preferred embodiment of a two-stage water-saving flushing device for a toilet tank in the present invention, showing it flushing a large amount of water by pressing a pressing rod to let a first arm move.

The pressing unit 40 has a vertical cylinder 41 provided with an interior space 42, two holes 43, 44 in a bottom side as shown in FIGS. 10 and 12, and two opposite recesses 45. 45 in an upper outer surface. The two bottom holes 43, 44 have inserted through a pressing rod 50 and a pulling rod 51 respectively. The pressing rod 50 has a flange 52 in an intermediate portion, and a spring 54 is provided to fit around a lower portion of the pressing rod 50 under the flange 52 and on the bottom of the cylinder 41. The pulling rod 51 has a flange 53 in an intermediate portion, and a spring 55 is provided to fit around an upper portion of the pulling rod 51 on the flange 53 and under a stopper 56.

The stopper 56 have two opposite stop hooks 57, 57 provided under a disc body and two rod holes 60, 61 bored through the disc body. After the stopper 56 is closed on the cylinder 41, with the two stop hooks 57, 57 hooking with the two recesses 45, 45 of the cylinder 41, and with the pressing rod 50 and the pulling rod 51 respectively extending up through the two rod holes 60, 61, the upper lid C is closed on the tank, with the two rods 50, 51 protruding up the upper lid C. Then the two rods 50, 51 are respectively used to flush different volume of water so as to save it.

While the preferred embodiments of the invention have been described above, it will be recognized arid understood that various modifications may be made therein and the appended claims are intended to cover all such modifications which may fall within the spirit and scope of the invention.

What is claimed is:

1. A two-stage water-saving flushing device adapted to be fixed in a toilet tank comprising a flushing unit having a high-level exit tube and a low-level exit tube, both said exit tubes respectively provided with a valve, both said valves respectively connected with a first arm and a second arm by means of separated chains, a pressing unit at least including a base plate for securing said two arms, said base plate having a vertical cylinder standing upright thereon, said cylinder having female threads in an inner wall and a hole in a bottom side, a tube base positioned under said base plate at one side thereof and secured to an overflow tube, said first arm positioned under said base plate, said second arm positioned under said first arm, said cylinder housing a function rod of said pressing unit, a pressing tube of said pressing unit having a spring respectively fitting around an upper portion and a lower portion thereof, said pressing tube having a bottom end resting on an outer surface of one end of said first arm, said pressing tube having a center hole for said function rod of said pressing unit to pass through, said function rod having a flange in an intermediate portion thereof for limiting movement of said function rod and a stopper connected to said cylinder by means of engagement of male threads of said stopper and said female threads of said cylinder, and said function rod protruding up through said stopper and screwed to a button, said button pressed down to move down said function rod for flushing a larger amount of water and pulled up for flushing a small amount of water.

2. The two-stage water-saving flushing device adapted to be fixed in a toilet tank as claimed in claim 1, wherein said overflow tube has an inner tube extensibly fitted therein so that said inner tube may be extended so as to be applied to different sized toilet tanks.

3. A two-stage water-saving flushing device adapted to be fixed in a toilet tank comprising a flushing unit having at least a high-level exit tube and a low-level exit tube, said high-level exit tube and said low-level exit tube respectively having a valve for stopping water from flowing through said tubes, said two valves respectively connected with a lower end of a first arm and a second arm by means of separated chains, a pressing unit at least including a base plate for securing said two arms, said base plate having a vertical cylinder, a tube base positioned under one side of said base plate and secured to an overflow tube, said first arm connected with said low-level exit tube valve and being fixed under said base plate, said second arm connected with said high-level exit tube valve and being fixed under said first arm, said cylinder having two opposite recesses on an outer surface near an upper end and two holes in a bottom side for a pressing rod and a pulling rod to pass through, by said pressing rod having a spring fitting around an upper portion thereof, said pulling rod having a spring fitting around a lower portion thereof, and a stopper provided with two opposite hooks hooking with said two opposite recesses of said cylinder so as to close an upper mouth of said cylinder, said stopper having two holes in a disc portion for said pressing rod and said pulling rod to pass there through whereby said pressing rod is pressed to flush out a large amount of water by actuating said first arm to pull up said valve of said low-level exit tube, and said pulling rod is pulled up to flush out a small amount of water with by actuating second arm to pull up said valve of said high-level exit tube.

* * * * *